(12) United States Patent
Furui

(10) Patent No.: US 9,189,836 B2
(45) Date of Patent: Nov. 17, 2015

(54) IMAGE PROCESSING DEVICE, IMAGE PROCESSING METHOD, AND PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 271 days.

(21) Appl. No.: 13/783,848

(22) Filed: Mar. 4, 2013

(65) Prior Publication Data

US 2013/0235082 A1   Sep. 12, 2013

(30) Foreign Application Priority Data

Mar. 8, 2012   (JP) ................................. 2012-051920

(51) Int. Cl.
| | |
|---|---|
| H04N 9/31 | (2006.01) |
| G03B 21/14 | (2006.01) |
| G06T 5/00 | (2006.01) |
| G09G 3/00 | (2006.01) |

(52) U.S. Cl.
CPC ............... *G06T 5/006* (2013.01); *G03B 21/14* (2013.01); *G03B 21/147* (2013.01); *G09G 3/002* (2013.01); *H04N 9/3185* (2013.01); *H04N 9/3194* (2013.01)

(58) Field of Classification Search
CPC . H04N 9/3185; H04N 9/3194; H04N 9/3197; G03B 21/14; G03B 21/147; G03B 21/142; G06T 5/006

USPC ............... 353/121, 122, 69, 70; 348/745, 746
See application file for complete search history.

(56) References Cited

U.S. PATENT DOCUMENTS

| | | | |
|---|---|---|---|
| 7,347,564 B2 | 3/2008 | Matsumoto et al. | |
| 8,251,524 B2 | 8/2012 | Furui | |
| 8,272,746 B2 | 9/2012 | Furui | |
| 2005/0162624 A1* | 7/2005 | Miyasaka | ..................... 353/101 |

FOREIGN PATENT DOCUMENTS

| | | |
|---|---|---|
| JP | A-2006-060447 | 3/2006 |
| JP | A-2008-211355 | 9/2008 |
| JP | A-2010-050540 | 3/2010 |
| JP | A-2010-050542 | 3/2010 |
| JP | A-2011-176705 | 9/2011 |

* cited by examiner

*Primary Examiner* — William C Dowling
*Assistant Examiner* — Ryan Howard
(74) *Attorney, Agent, or Firm* — Oliff PLC

(57) ABSTRACT

A measurement pattern having a predetermined shape and L-shaped black areas are superimposed and output to a liquid crystal panel, and a pattern is detected from a taken pattern image. Lines are detected based on an image of a screen frame in the pattern image, and coordinate conversion factors for conversion of camera coordinates in the taken image into panel coordinates are calculated based on panel coordinate values of the pattern and camera coordinate values of the pattern detected from the pattern image. Then, apexes of the screen frame in the panel coordinates are obtained based on the lines and the conversion coordinate factors detected with respect to each corner, correction values are calculated, and trapezoidal distortion correction is performed.

17 Claims, 13 Drawing Sheets

IMAGE PROCESSING DEVICE, IMAGE PROCESSING METHOD, AND PROJECTOR

The entire disclosure of Japanese Patent Application No. 2012-051920, filed Mar. 8, 2012 is expressly incorporated by reference herein.

BACKGROUND

1. Technical Field

The present invention relates to an image processing device, an image processing method, and a projector.

2. Related Art

In the case where an image is displayed on a screen using a projector, trapezoidal distortion may be produced in the image displayed on the screen (hereinafter, referred to as "display image") according to a relative positional relationship between the projector and the screen. Regarding the problem, for example, Patent Document 1 (JP-A-2008-211355) has disclosed a technology of imaging a screen using an imaging device of a projector, detecting a screen frame from the taken image, and correcting trapezoidal distortion based on the detected shape of the screen frame.

However, in the technology of Patent Document 1, the screen frame is detected as four lines in total one for each of vertical and horizontal frame sides. Generally, distortion exists in a camera lens for imaging of the projector, and it has been difficult to accurately detect the screen frame as four lines. Further, in the technology of Patent Document 1, in order to detect the lines, a black image is formed on the entire projection panel and projected on the screen. Accordingly, while the black image is projected on the screen, it is impossible for a user to confirm an image on which trapezoidal distortion correction has been performed.

Further, JP-A-2010-050540, JP-A-2010-050542, and JP-A-2006-060447 are examples of related art.

SUMMARY

An advantage of some aspects of the invention is to provide a technology of detecting a screen frame more accurately, and performing trapezoidal distortion correction. Another advantage of some aspects of the invention is to provide a technology that enables confirmation of an image on which trapezoidal distortion correction has been performed even while detection of the screen frame is performed.

The invention can be implemented as the following forms or application examples.

APPLICATION EXAMPLE 1

This application example is directed to an image processing device including a pattern output part that superimposes a pattern having a predetermined shape and a nearly black area on a part of an image and outputs the image to a light modulator, a pattern detection part that detects the pattern from a pattern image formed by imaging of the image containing the pattern and the nearly black area projected on a projected surface, a line detection part that respectively detects lines based on a taken image of at least a part of a frame of the projected surface within the nearly black area in the pattern image, a coordinate conversion factor calculation part that calculates a coordinate conversion factor for conversion of coordinates in the taken image into coordinates in the light modulator based on coordinates of the pattern in the light modulator and coordinates of the pattern detected from the pattern image, a correction value calculation part that obtains an apex of the frame based on the detected lines and the coordinate conversion factor, and calculates a correction value for trapezoidal distortion correction based on the apex, and a distortion correction part that performs trapezoidal distortion correction based on the correction value.

According to the configuration, the pattern having the predetermined shape and the nearly black area only cover a part of the image, and thus, trapezoidal distortion correction may be performed by detecting the lines of the frame of the projected surface and calculating the correction value based on the lines and the coordinate conversion factor without disturbing user's view of the image. Further, the user may confirm the input image after trapezoidal distortion correction in real time.

APPLICATION EXAMPLE 2

This application example is directed to the image processing device according to Application Example 1, wherein the line detection part respectively detects two crossing lines with respect to each corner of the projected surface based on the taken image of the at least the part of the frame of the projected surface within the nearly black area in the pattern image, and the correction value calculation part obtains apexes of the frame based on the detected two lines with respect to each corner and the coordinate conversion factors, and calculates a correction value for trapezoidal distortion correction based on the apexes.

According to the configuration, the crossing two lines are respectively detected with respect to each corner of the projected surface, and the lines in the corner parts of the projected surface that are easily affected by the lens distortion of the camera may be detected more accurately. Accordingly, trapezoidal distortion correction may be performed more accurately by calculating the correction value based on the lines and the coordinate conversion factors without disturbing user's view of the image.

APPLICATION EXAMPLE 3

This application example is directed to the image processing device according to Application Example 1 or 2, wherein the pattern output part outputs an image formed by trapezoidal distortion correction on an input image or an image formed by trapezoidal distortion correction on a predetermined figure.

According to the configuration, the input images may be continuously displayed in real time, and viewing may not be interrupted and stress on the user may be reduced. Further, by projecting the image formed by trapezoidal distortion correction on a predetermined shape, the processing load for trapezoidal distortion correction on the input images is reduced and the shapes of the corrected input images may be displayed at a high speed.

APPLICATION EXAMPLE 4

This application example is directed to the image processing device according to any one of Application Examples 1 to 3, wherein the correction value calculation part calculates at least one intermediate correction value of a current correction value and a previous correction value calculated before calculation of the current correction value, and the distortion correction part performs the trapezoidal distortion correction based on the intermediate correction value.

According to the configuration, the image formed by trapezoidal distortion correction based on the intermediate correction value between the previous correction value and the current correction value may be projected, and then, the image formed by trapezoidal distortion correction based on the intermediate correction value and the image formed by trapezoidal distortion correction based on the current correction value may be projected. Accordingly, the images after trapezoidal distortion correction may be smoothly changed and displayed, and thus, the user may confirm the images after trapezoidal distortion correction without a feeling of strangeness.

APPLICATION EXAMPLE 5

This application example is directed to the image processing device according to any one of Application Examples 2 to 4, wherein the pattern output part stops output of the pattern having the predetermined shape and the nearly black area if a shape of the frame of the image formed by the trapezoidal distortion correction or a shape of the frame of the image formed by the trapezoidal distortion correction on the predetermined figure has not changed in a predetermined time, and extends the predetermined time if the line detection part has not respectively detected two crossing lines with respect to each corner of the projected surface based on the frame image.

According to the configuration, if the two crossing lines have not been respectively detected with respect to each corner of the projected surface, the time in which the pattern having the predetermined shape and the nearly black area are projected is extended. Accordingly, the line detection part may secure the time for redetection of the undetected lines, and thus, the detection probability of lines may be improved.

APPLICATION EXAMPLE 6

This application example is directed to the image processing device according to any one of Application Examples 2 to 5, wherein the pattern is located for each corner of the light modulator, the coordinate conversion factor calculation part respectively calculates the coordinate conversion factor with respect to each corner of the projected surface, and the correction value calculation part obtains the apex based on the detected two crossing lines with respect to each corner of the projected surface and the coordinate conversion factor corresponding to the corner.

According to the configuration, the coordinate conversion factor is calculated with respect to each corner of the projected surface, and thus, the apexes may be obtained by minimizing the influence of distortion of the lens of the camera and distortion of the projection lens, accurately detecting the lines in the corner parts of the projected surface that are easily affected by the lens distortion of the camera, and calculating intersection of the lines in the light modulator. Therefore, trapezoidal distortion correction may be performed more accurately.

APPLICATION EXAMPLE 7

This application example is directed to the image processing device according to any one of Application Examples 2 to 6, wherein the correction value calculation part obtains the apex of the frame after the line detection part converts the two lines detected with respect to each corner into coordinates in the light modulator.

According to the configuration, the intersection of the two lines is calculated and the apex of the frame is obtained after the two lines detected with respect to each corner are converted into coordinates in the light modulator, and thus, the shape of the screen may be detected with high accuracy. Therefore, trapezoidal distortion correction may be performed with higher accuracy.

The invention may not only be configured as the above described image processing device but also be configured as an image processing method, a projector including the image processing device, or a computer program. The computer program may be recorded in a computer-readable recording medium. As the recording medium, for example, various media such as a flexible disc, a CD-ROM, a DVD-ROM, a magnetooptical disc, a memory card, and a hard disc may be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Configuration of Projector

Figure 1:
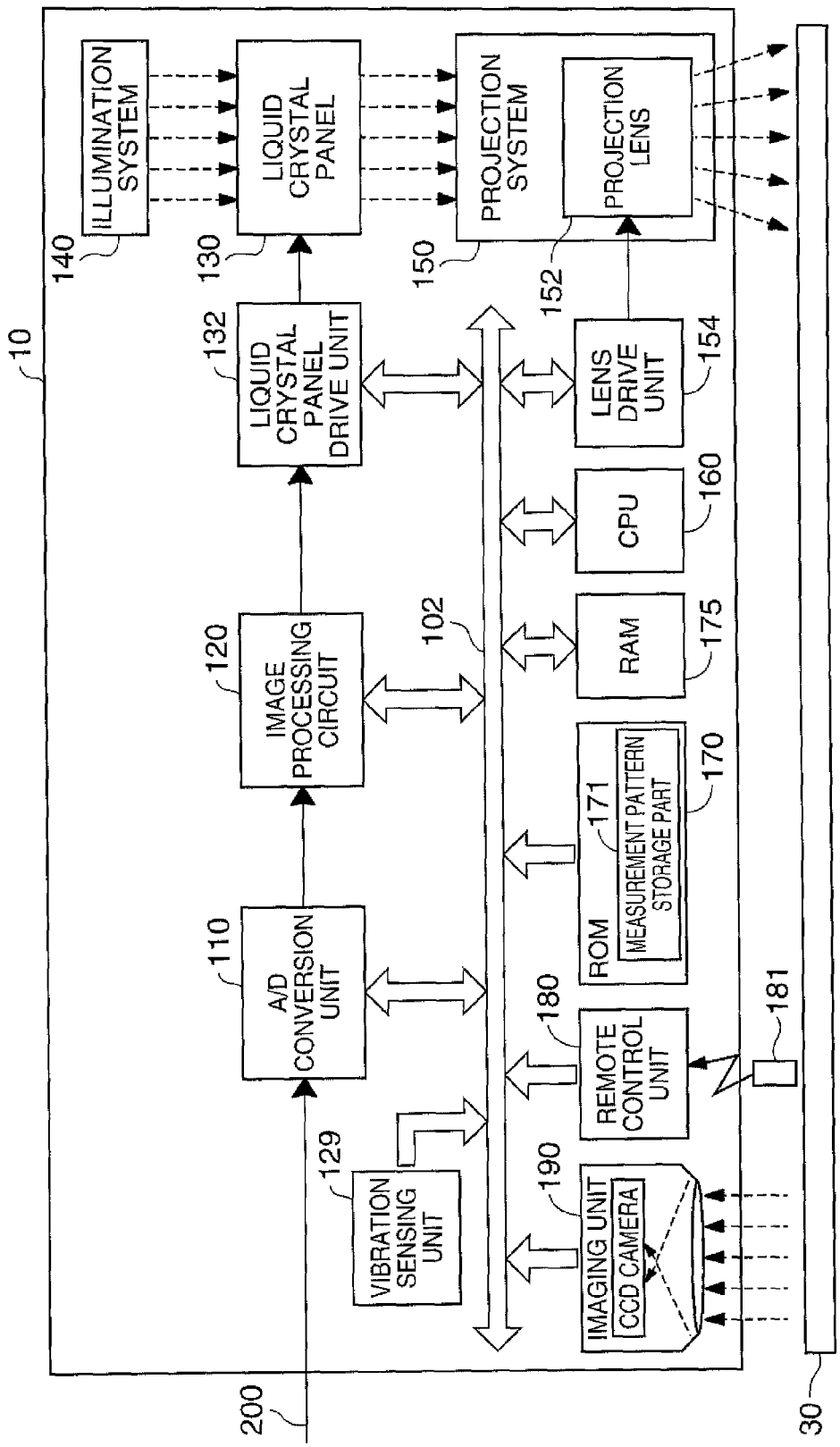
FIG. 1 is an explanatory diagram showing a hardware configuration of a projector as an image processing device according to an embodiment of the invention.

FIG. 1 is an explanatory diagram showing a hardware configuration of a projector 10 as an image processing device according to an embodiment of the invention. The projector 10 projects image light representing an image and displays the image on a projected surface such as a screen 30.

The projector 10 includes an A/D (analog/digital) conversion unit 110, an image processing circuit 120, a liquid crystal panel 130, a liquid crystal panel drive unit 132, an illumination system 140, a projection system 150 having a projection lens 152, a lens drive unit 154, a CPU 160, a RAM 175, a ROM 170 having a measurement pattern storage part 171, a remote control unit 180, a remote 181, an imaging unit 190, and a vibration sensing unit 129. The respective component elements of the projector 10 are connected to one another via a bus 102.

The A/D conversion unit 110 performs A/D conversion on input image signals input from an image supply device such as a DVD player or PC (personal computer) (not shown) via a cable 200, and outputs digital image signals.

The image processing circuit 120 includes various functional parts that execute image processing. The image processing circuit 120 performs screen frame correction processing and adjustment of image display conditions (for example, brightness, contrast, synchronization, tracking, color density, color shade, etc.) on the digital image signals output from the A/D conversion unit 110 (hereinafter, referred to as "input image"), and outputs the signals to the liquid crystal panel drive unit 132. The screen frame correction processing and the functional parts of the image processing circuit 120 will be described later.

The liquid crystal panel drive unit 132 drives the liquid crystal panel 130 based on the digital image signals input via the image processing circuit 120.

The illumination system 140 includes a light source that outputs light and a homogenizing system that homogenizes an illuminance distribution of the light output from the light source. The light output from the illumination system 140 enters the liquid crystal panel 130.

The liquid crystal panel 130 is a light modulator that modulates the light output from the illumination system 140 based on image data. The liquid crystal panel 130 forms an image (hereinafter, also referred to as "panel image") for modulating the illumination light radiated from the illumination system 140 into effective image light representing an image on the liquid crystal panel 130.

The projection system 150 is attached to the front surface of the casing of the projector 10, and enlarges and projects the light that has been modulated into the image light by the liquid crystal panel 130. The lens drive unit 154 drives the projection lens 152 of the projection system 150 to change the size of the display image to be displayed on the screen 30. The liquid crystal panel 130, the illumination system 140, and the projection system 150 form a projection unit that projects images.

The remote control unit 180 receives a command from a user by the remote 181, and transmits the command to the CPU 160 via the bus 102. Note that, in the embodiment, the projector 10 receives the command from the user through the remote 181 and the remote control unit 180, however, may receive the command from the user through another configuration such as an operation panel, for example.

The imaging unit 190 includes a CCD camera, and takes and acquires various images. Hereinafter, the image taken by the imaging unit 190 will be also referred to as "taken image". Of the taken images, an image obtained by imaging of at least a part of the frame of the screen 30 (hereinafter, also referred to as "screen frame SCF) will be also referred to as "frame image", and an image obtained by imaging of a measurement pattern (the details will be described later) projected on the screen 30 will be also referred to as "pattern image". The taken images acquired by the imaging unit 190 are stored within the RAM 175. Note that the imaging unit 190 may include another device that can image in place of the CCD camera.

The vibration sensing unit 129 monitors movements and rests of the projector 10. The vibration sensing unit 129 includes a gyro sensor (not shown) in the embodiment, and senses the movements of the projector 10 using the gyro sensor. The CPU 160 allows the image processing circuit 120 to execute the screen frame correction processing in response to the command from the remote control unit 180 and the sensing result by the vibration sensing unit 129. The screen frame correction processing will be described later.

B. Configuration of Image Processing Circuit

Figure 2:
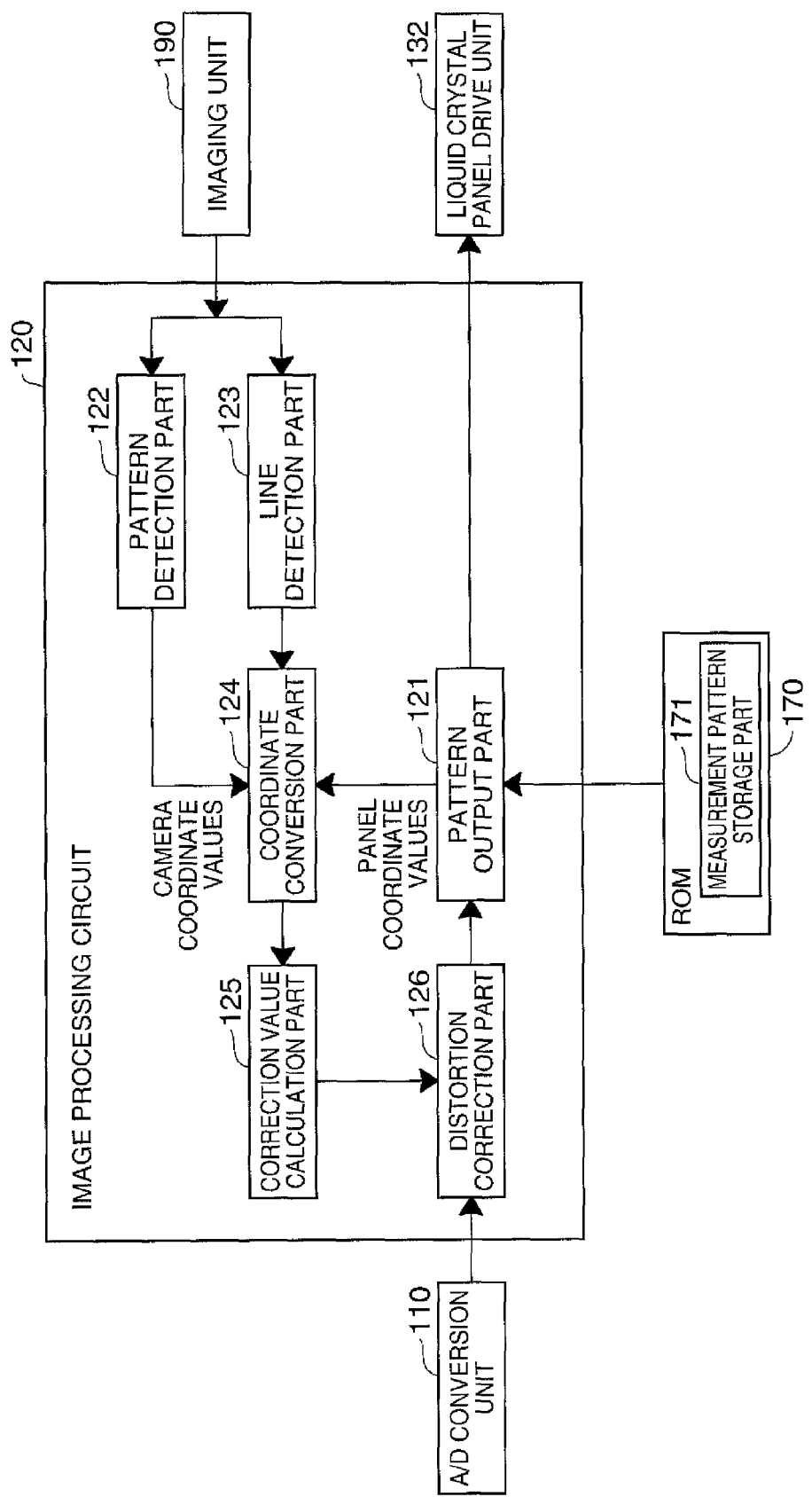
FIG. 2 is a block diagram showing a specific configuration of an image processing circuit shown in FIG. 1.

FIG. 2 is a block diagram showing a specific configuration of the image processing circuit 120 shown in FIG. 1. As illustrated, the image processing circuit 120 includes a pattern output part 121, a pattern detection part 122, a line detection part 123, a coordinate conversion part 124, a correction value calculation part 125, and a distortion correction part 126.

The pattern detection part 122 detects measurement points for the screen frame correction processing to be described later based on the pattern image taken by the imaging unit 190. The measurement points will be described later.

The line detection part 123 detects two crossing lines based on the frame image taken by the imaging unit 190 with respect to each corner of the screen 30. Accordingly, the line detection part 123 detects eight lines in total for the screen 30 having four corners.

The coordinate conversion part 124 calculates a coordinate conversion factor based on the coordinate values of the measurement points of the measurement pattern in the liquid crystal panel 130 and the coordinate values of the measurement points in the taken image detected by the pattern detection part 122. Note that, in the following explanation, the coordinate system in the liquid crystal panel 130 will be also referred to as "panel coordinates" and the coordinate system in the taken image will be also referred to as "camera coordinates". The coordinate conversion factor is a factor for conversion of camera coordinate values into panel coordinate values.

The correction value calculation part 125 calculates a correction value for trapezoidal distortion correction based on the coordinate conversion factor calculated by the coordinate conversion part 124 and the lines detected by the line detection part 123.

The distortion correction part 126 performs trapezoidal distortion correction on the input image acquired from the A/D conversion unit 110 using the correction value calculated by the correction value calculation part 125.

The pattern output part 121 superimposes measurement pattern on the input image or the input image after trapezoidal distortion correction at the screen frame correction to be described later.

C. Initial Screen Frame Correction Processing

Figure 3:
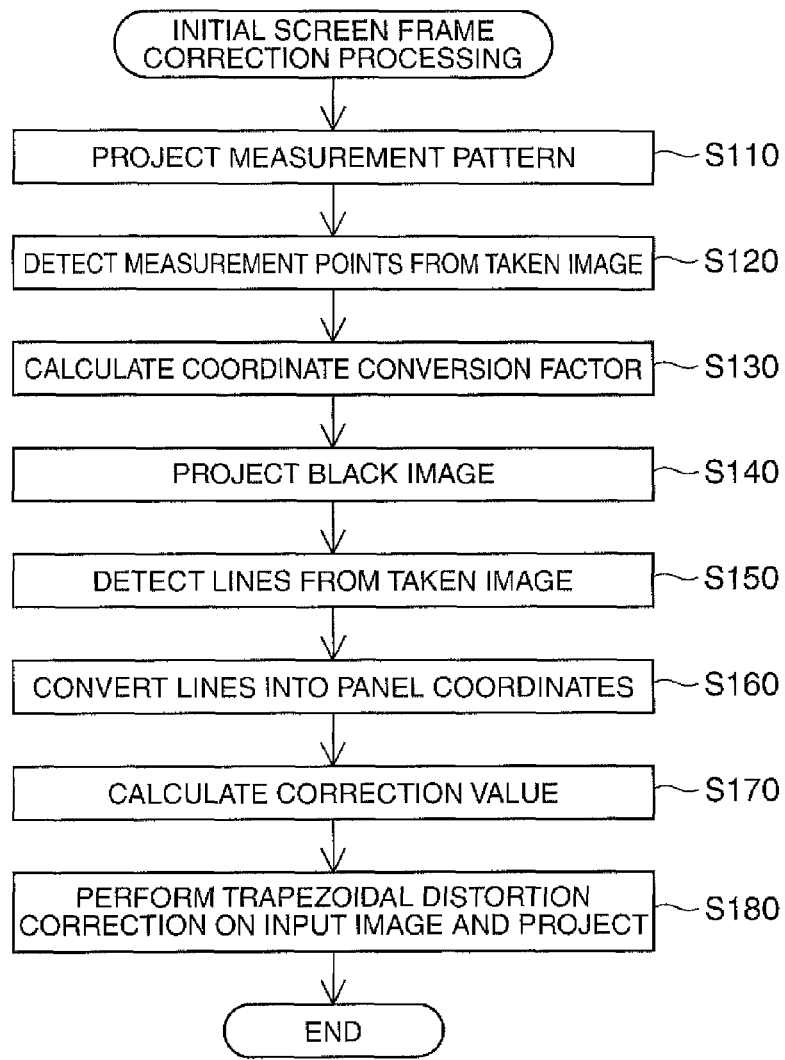
FIG. 3 is a flowchart showing a flow of initial screen frame correction processing by the projector.

FIG. 3 is a flowchart showing a flow of initial screen frame correction processing by the projector 10. The screen frame correction processing is a series of processing of performing trapezoidal distortion correction on the input image so that the respective sides of the outer periphery of the display image may coincide with the screen frame. The initial screen frame correction processing is executed in response to the command from the user through the remote 181 after installation of the projector 10, for example. Note that the initial screen frame correction processing may be automatically executed in response to the power on, the image signal input, or the like, for example.

When the initial screen frame correction processing is started, the pattern output part 121 projects a measurement pattern on the screen 30 (step S110). Specifically, the pattern output part 121 reads out image data representing the measurement pattern stored in the measurement pattern storage part 171 of the ROM 170, superimpose the data on the input image, and outputs it to the liquid crystal panel drive unit 132, and thereby, the measurement pattern is projected. The measurement pattern is expressed by panel coordinate values. The panel coordinate values of the measurement points of the measurement pattern are acquired by the pattern output part 121.

Figure 4:
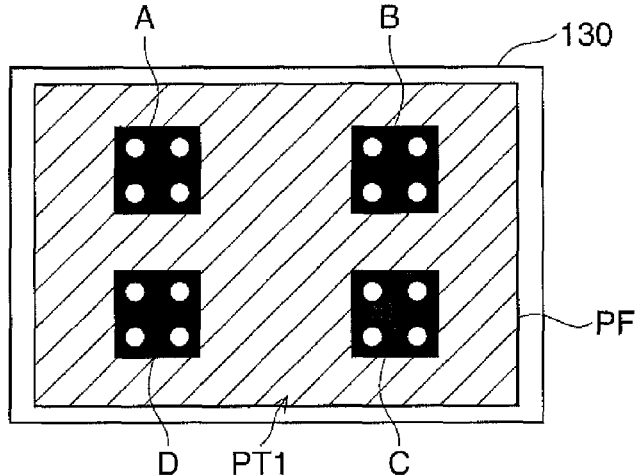
FIG. 4 shows an example of a measurement pattern formed on a liquid crystal panel.

FIG. 4 shows an example of a measurement pattern PT1 formed on liquid crystal panel 130. The measurement pattern PT1 shown in FIG. 4 contains pattern areas A, B, C, D each including four measurement points in white circles and a surrounding black area having a nearly square shape. The pattern area A is located near the upper left corner within the liquid crystal panel 130, the pattern area 33 is located near the upper right corner of the liquid crystal panel 130, the pattern area C is located near the lower right corner of the liquid crystal panel 130, and the pattern area D is located near the lower left corner of the liquid crystal panel 130. The outer frame of the measurement pattern PT1 (measurement pattern frame PF) coincides with the image formation frame of the liquid crystal panel 130. The shaded area in FIG. 4 is an area in which the input image transmitted from the cable 200 to the liquid crystal panel drive unit 132 via the A/D conversion unit 110 is formed.

Figure 5:
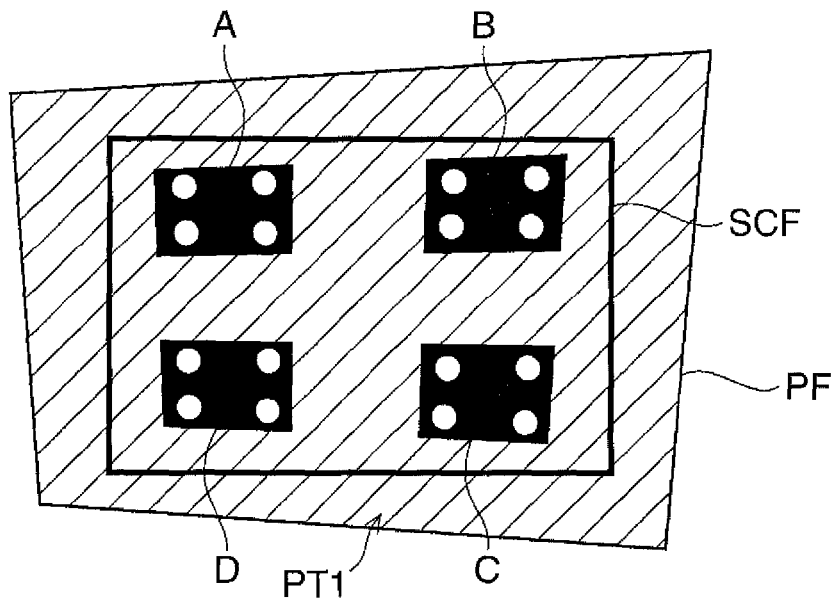
FIG. 5 shows an example of a display image of the measurement pattern projected on a screen.

FIG. 5 shows an example of a display image of the measurement pattern PT1 projected on the screen 30. In the embodiment, the projection lens 152 is not right opposite to the screen 30. Accordingly, the display image of the measurement pattern PT1 shows a trapezoidal shape as shown in FIG. 5. In the display image of the measurement pattern PT1, the measurement points of the pattern area A are located near the upper left corner of the screen 30, the measurement points of the pattern area B are located near the upper right corner of the screen 30, the measurement points of the pattern area C are located near the lower right corner of the screen 30, and the measurement points of the pattern area D are located near the lower left corner of the screen 30.

Figure 6:
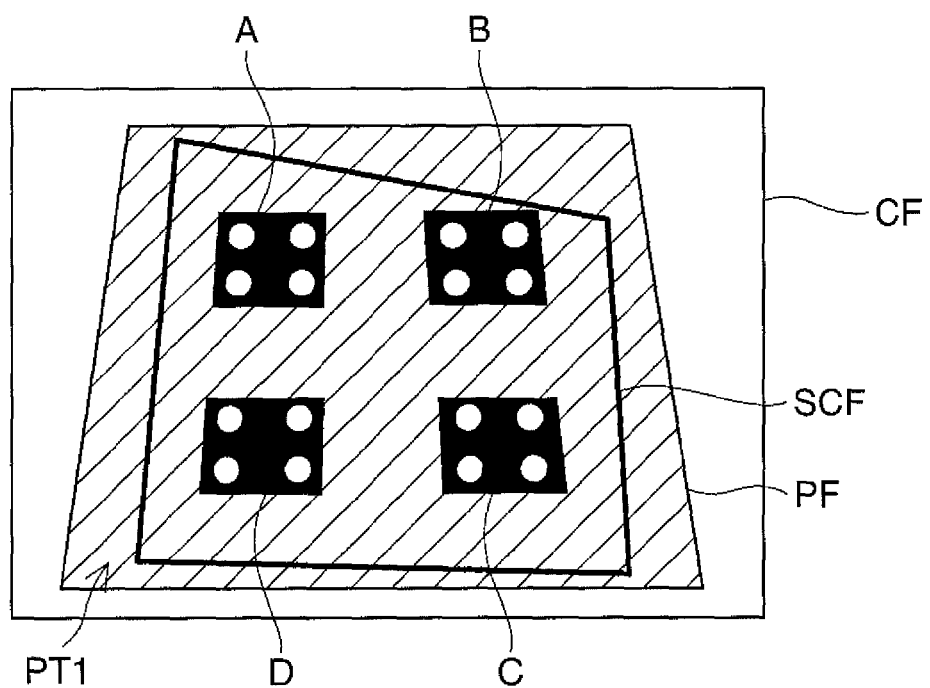
FIG. 6 shows an example of a taken image of the measurement pattern.

Then, the imaging unit 190 performs imaging of the display image of the measurement pattern PT1, and the pattern detection part 122 detects the measurement points in the camera coordinates by performing an image analysis on the taken image (pattern image) by a known method (step S120). FIG. 6 shows an example of the taken image of the measurement pattern PT1. In the example shown in FIG. 6, in the taken image, the whole display image having the measurement pattern frame PF at the outer side than the screen frame SCF is projected within the frame of the CCD camera (camera frame CF) of the imaging unit 190. By the analysis of the taken image, camera coordinate values corresponding to the four measurement points in the respective pattern areas are acquired.

After the panel coordinate values and the camera coordinate values corresponding to the measurement points in the respective pattern areas are acquired, the coordinate conversion part 124 calculates the coordinate conversion factors with respect to the respective pattern areas (step S130). Specifically, the coordinate conversion part 124 calculates the coordinate conversion factor A using the panel coordinate values and the camera coordinate values of the measurement points of the pattern area A. Similarly, the coordinate conversion part 124 calculates the coordinate conversion factor B using the panel coordinate values and the camera coordinate values of the measurement points of the pattern area B, the coordinate conversion factor C using the panel coordinate values and the camera coordinate values of the measurement points of the pattern area C, and the coordinate conversion factor D using the panel coordinate values and the camera coordinate values of the measurement points of the pattern area D. In the embodiment, a projection conversion factor is obtained as the coordinate conversion factor based on the four measurement points. The information of the calculated coordinate conversion factors A to D is stored in the RAM 175.

Then, in order to acquire the frame image, the pattern output part 121 projects the black image for imaging the screen frame SCF on the screen 30 (step S140). Specifically, the pattern output part 121 outputs black image data to the liquid crystal panel drive unit 132. The liquid crystal panel drive unit 132 forms a black image on the liquid crystal panel 130 based on the output image data. When the black image data used in the embodiment is formed on the liquid crystal panel 130, the whole image formation area of the liquid crystal panel 130 becomes a black area. In this manner, the solid black image is displayed on the screen 30 via the projection system 150.

When the black image is projected, the imaging unit 190 performs imaging of the projected black image and acquires the frame image. The line detection part 123 detects the lines on the screen frame from the frame image, two lines for each side, eight lines in total (step S150).

Figure 7:
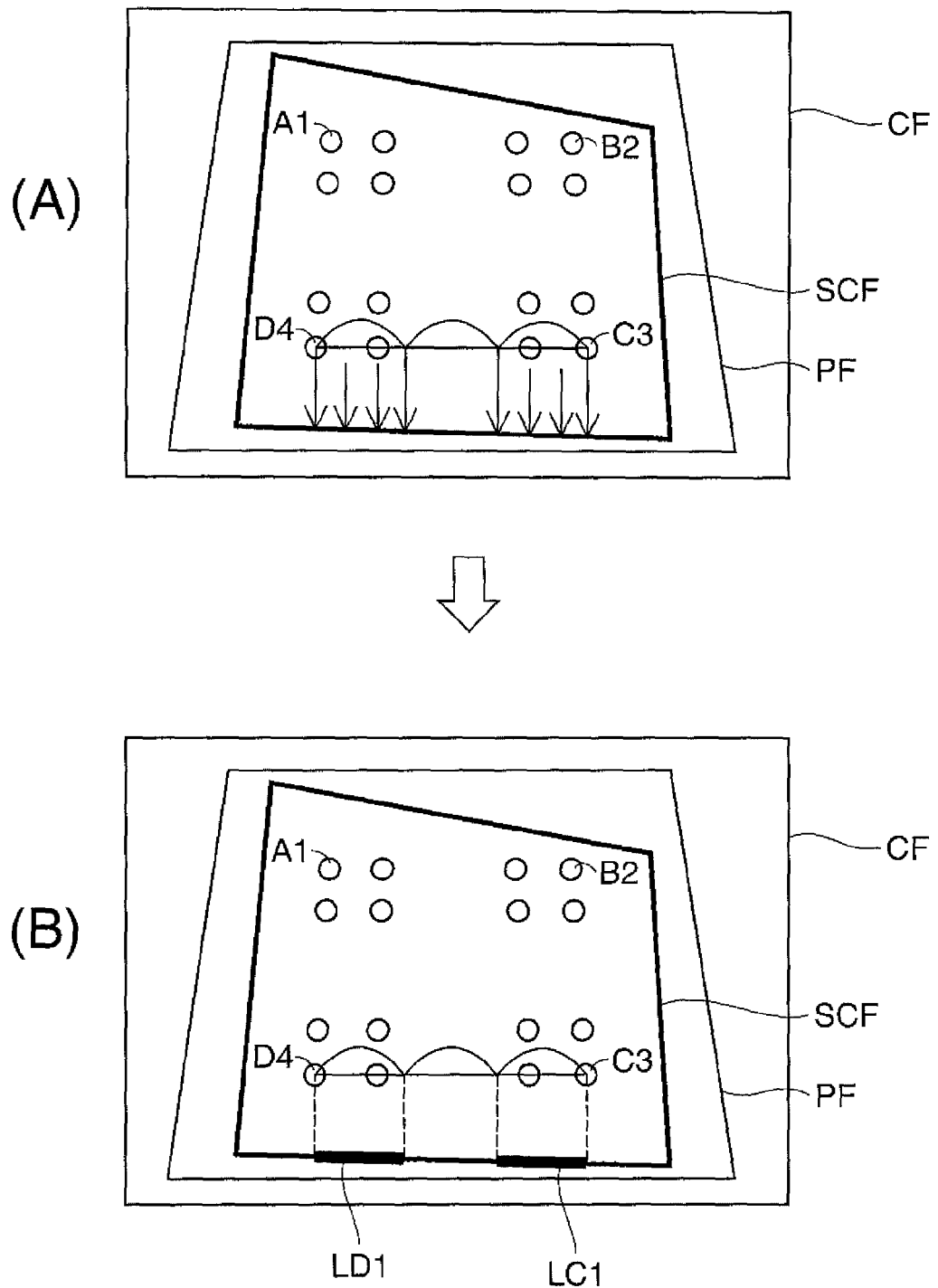
FIG. 7 shows diagrams for explanation of an example of a method of detecting lines from a frame image.

FIG. 7 shows diagrams for explanation of an example of a method of detecting lines from the frame image. Hereinafter, the lines corresponding to the screen frame SCF will be referred to as "screen frame lines". The parts corresponding to the screen frame SCF of the acquired frame image are shown by black frames in FIG. 7. Note that the circular measurement points shown in FIG. 7 are detected at step S120, not contained in the frame image. The measurement points shown in FIG. 7 are shown with the frame image for explanation of the detection of the screen frame lines. In the following drawings, the circular measurement points are similarly shown.

Specifically, the detection of the screen frame lines is performed in the following manner. For example, for detection of the two lines at the lower side of the screen frame, first, a line segment C3D4 is formed by connecting the measurement point C3 in the lower right corner and the measurement point D4 in the lower left corner detected at step S120, and the line segment C3D4 is equally divided into three. Then, edge detection is performed by applying an outline extraction filter such as a differentiation filter or a Laplacian filter downwardly with the line segments at the inner sides of one-third of the line segment C3D4 from the measurement point C3 and the measurement point D4 as start points ((A) in FIG. 7). The line detection part 123 detects the screen frame lines LD1 and LC1 using least squares, Hough transform, or the like, for example, within the range of the detected edge ((B) in FIG. 7). Similarly, the line detection part 123 forms line segments by respectively connecting the measurement points D4 and A1, the measurement points A1 and B2, and the measurement points B2 and C3, and the detects two screen frame lines with respect to one side of the screen frame. In this manner, the line detection part 123 detects eight screen frame lines in total.

Figure 8:
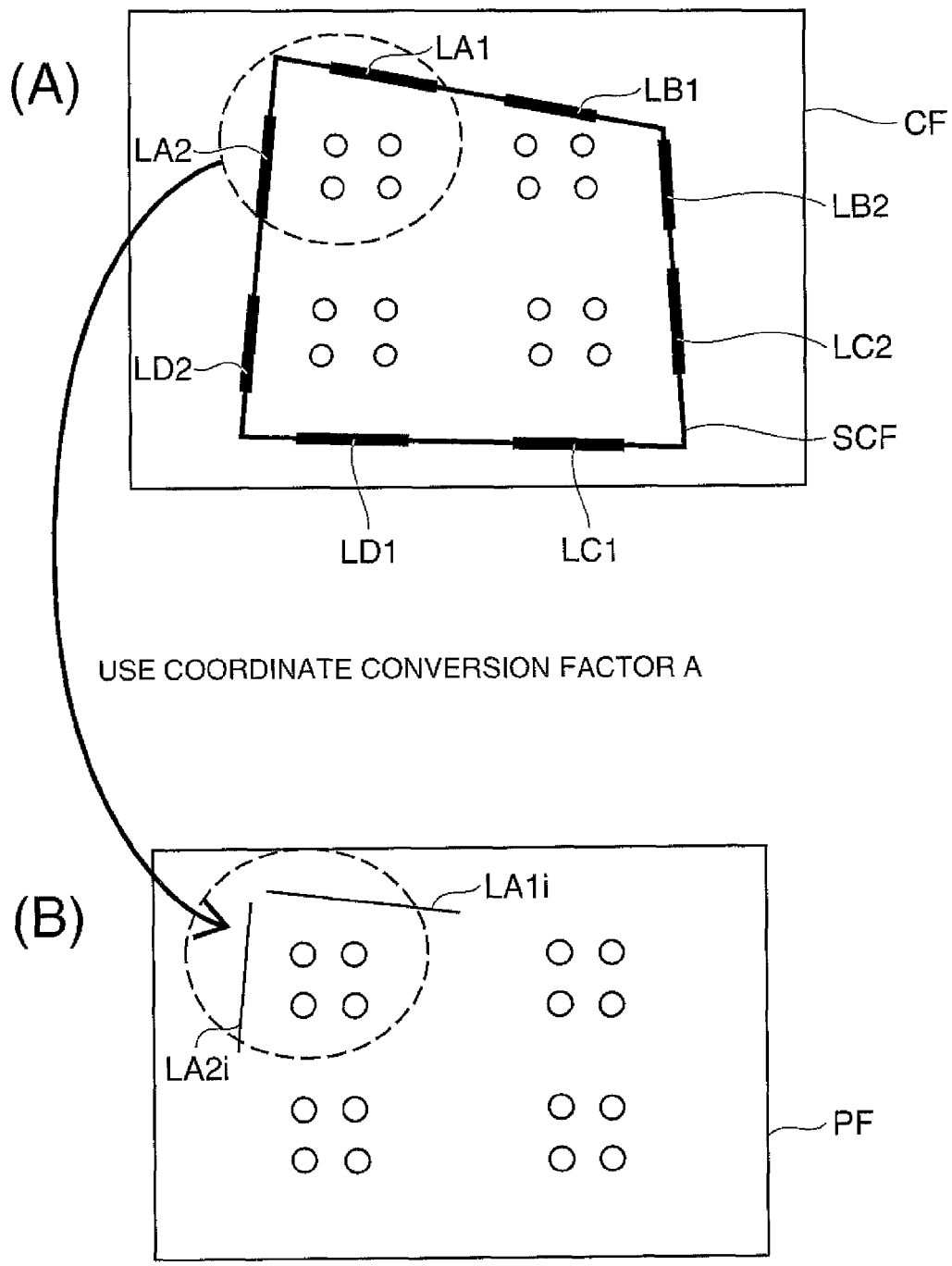
FIG. 8 shows diagrams for explanation of a method of converting screen frame lines from camera coordinates into panel coordinates.

After the line detection part 123 detects the eight screen frame lines, the coordinate conversion part 124 converts the eight screen frame lines in the camera coordinates into screen frame lines in the panel coordinates using the coordinate conversion factors calculated at step S130 (step S160). FIG. 8 shows diagrams for explanation of a method of converting the screen frame lines from the camera coordinates into the panel coordinates. (A) in FIG. 8 shows the screen frame lines LA1, LA2, LB1, LB2, LC1, LC2, LD1, LD2 in the camera coordinates detected at step S150. The coordinate conversion part 124 converts the screen frame lines LA1, LA2 in the camera coordinates into screen frame lines LA1$i$, LA2$i$ in the panel coordinates by projection conversion using the coordinate conversion factor A calculated at step S130. Similarly, the coordinate conversion part 124 respectively converts the screen frame lines LB1, LB2 using the coordinate conversion factor B, the screen frame lines LC1, LC2 using the coordinate conversion factor C, and the screen frame lines LD1, LD2 using the coordinate conversion factor D into screen frame lines in the panel coordinates. In this manner, the screen frame lines are converted from the camera coordinates into the panel coordinates using the coordinate conversion factors calculated by the four measurement points closer to the respective screen frame lines.

After the screen frame lines in the camera coordinates are converted into the screen frame lines in the panel coordinates, the correction value calculation part 125 calculates the correction value for trapezoidal distortion correction (step S170).

Figure 9:
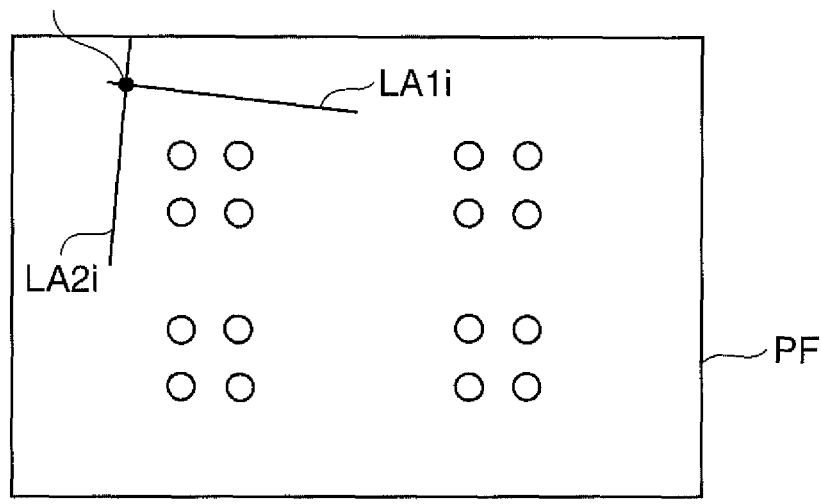
FIG. 9 is a diagram for explanation of a method of calculating a correction value.

FIG. 9 is a diagram for explanation of a method of calculating the correction value. First, for calculation of the correction value, an apex of the screen frame in the panel coordinates is obtained by obtaining an intersection V between the screen frame lines LA1$i$ and LA2$i$ as shown in FIG. 9. Similarly, the apexes of the screen frame in the panel coordinates are respectively obtained by obtaining an intersection between the screen frame lines LB1$i$ and LB2$i$, an intersection between the screen frame lines LC1$i$ and LC2$i$, and an intersection between the screen frame lines LD1$i$ and LD2$i$. Then, the correction value for trapezoidal distortion correction (for example, the projection conversion factor) of the input image is calculated by a known method (projection conversion) from the obtained coordinates of the apexes. The calculated correction value is stored in the RAM 175.

After the correction value is calculated, the distortion correction part 126 performs trapezoidal distortion correction on the input image using the calculated correction value (step S180). The calculation of the correction value and the trapezoidal distortion correction can be executed using a known method (for example, the method described in JP-A-2011-176705). The liquid crystal panel drive unit 132 forms the input image after trapezoidal distortion correction on the liquid crystal panel 130 based on the input image data. Thereby, the image after trapezoidal distortion correction is displayed on the screen 30 via the projection system 150.

Generally, lines contained in the taken image taken by the CCD camera may be gently curved due to the influence by the distortion of the lens of the CCD camera. Accordingly, it is difficult to accurately detect respective sides of the screen frame SCF as respective one lines. However, according to the above described projector 10 of the embodiment, the screen frame SCF is detected as eight lines in total, two lines for each corner of the screen 30. Accordingly, in the taken image, the lines in the corner parts of the screen 30, which are easily curved due to the influence by the distortion of the lens of the CCD camera may be detected more accurately. Therefore, the lines are converted into panel coordinates, and thereby, the shape of the screen 30 may be detected with high accuracy.

Further, the eight screen frame lines may be detected by edge detection from the line segment formed in the taken image (pattern image) of the measurement points projected near the corners of the screen 30 toward the screen frame. Accordingly, eight lines may be detected in a shorter time than that in the case where edge detection is performed with respect to the projected whole black image. Furthermore, in the embodiment, the coordinate conversion factors are calculated for each corner of the screen 30. Accordingly, the conversion of the coordinates in the corners of the screen 30 and the corners of the liquid crystal panel 130 that are easily affected by the distortion of the projection lens 152 projecting the measurement pattern PT1 and the distortion of the lens of the CCD camera may be performed more accurately. As a result, the trapezoidal distortion correction may be performed with high accuracy.

In addition, in the embodiment, the apexes of the screen frame are obtained after the detected eight lines are converted into the panel coordinates, and thereby, the shape of the screen 30 in the panel coordinates may be detected with high accuracy. Accordingly, the trapezoidal distortion correction may be performed with higher accuracy.

D. Automatic Screen Frame Correction Processing

Next, the case of performing automatic screen frame correction processing will be explained. The automatic screen frame correction processing is processing for automatically performing trapezoidal distortion correction when a movement of the projector 10 is sensed. The automatic screen frame correction processing is the same as the above described initial screen frame correction processing in that eight screen frame lines are detected in total, two lines for each corner of the screen 30 and coordinate conversion factors are calculated for each corner of the screen 30. However, there is a difference that the measurement pattern (step S110) and the black image (step S140) are separately projected in the initial screen frame correction processing and a measurement pattern containing both a black area for screen frame line detection and measurement points for coordinate conversion factor calculation is projected on an image (step S50) in the automatic screen frame correction processing. As below, the automatic screen frame correction processing will be explained with an emphasis on the difference.

Figure 10:
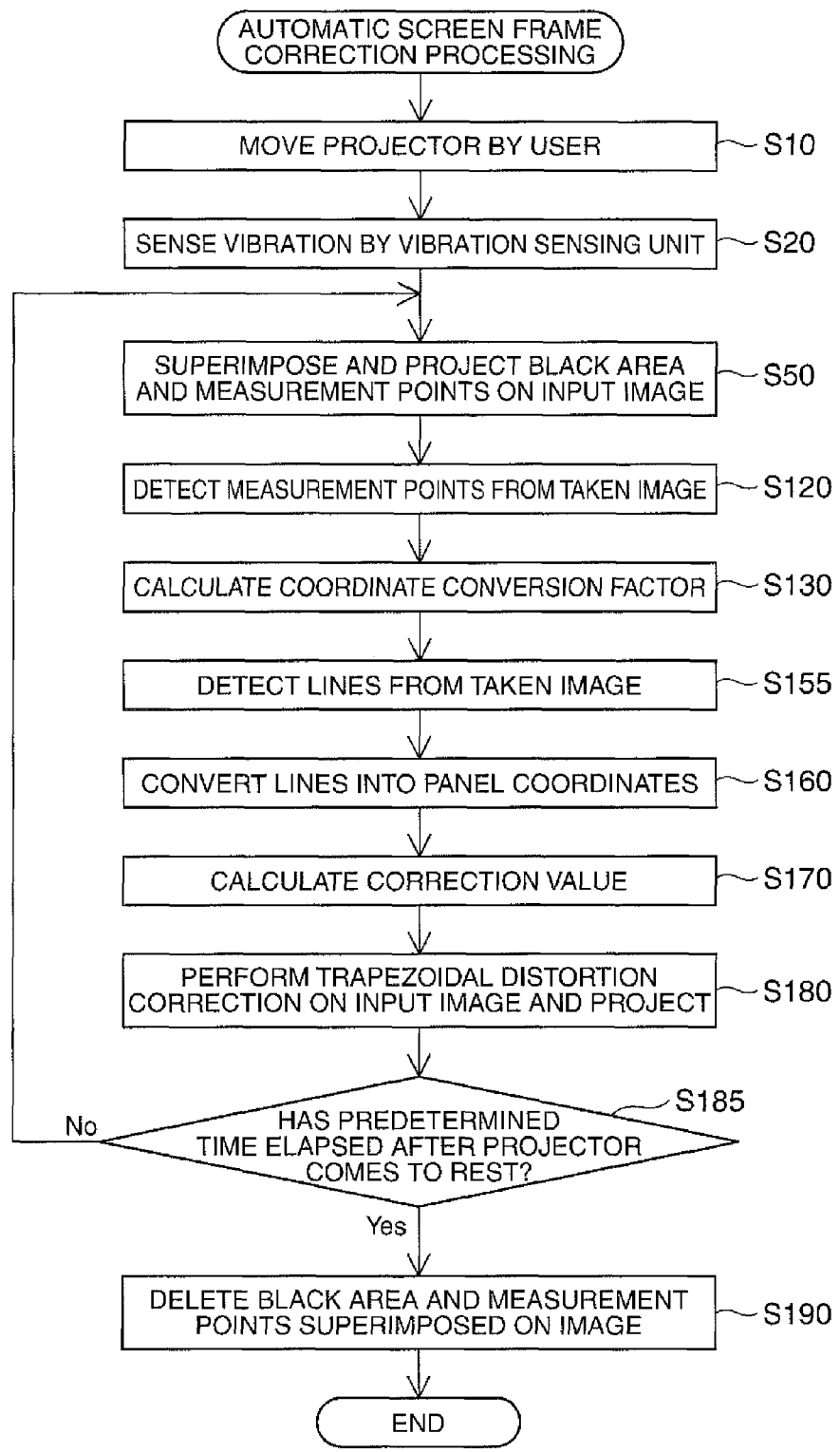
FIG. 10 is a flowchart for explanation of automatic screen frame correction processing.

FIG. 10 is a flowchart for explanation of the automatic screen frame correction processing. If a user moves the projector 10 (step S10), the vibration sensing unit 129 senses the vibration (movement) of the projector 10 (step S20).

After the vibration sensing unit 129 senses the vibration, the CPU 160 allows the image processing circuit 120 to execute the following processing from step S50 to step S180.

At step S50, the pattern output part 121 reads out image data representing a measurement pattern PT2 stored in the measurement pattern storage part 171 of the ROM 170, and projects the data on the screen 30.

Figure 11:
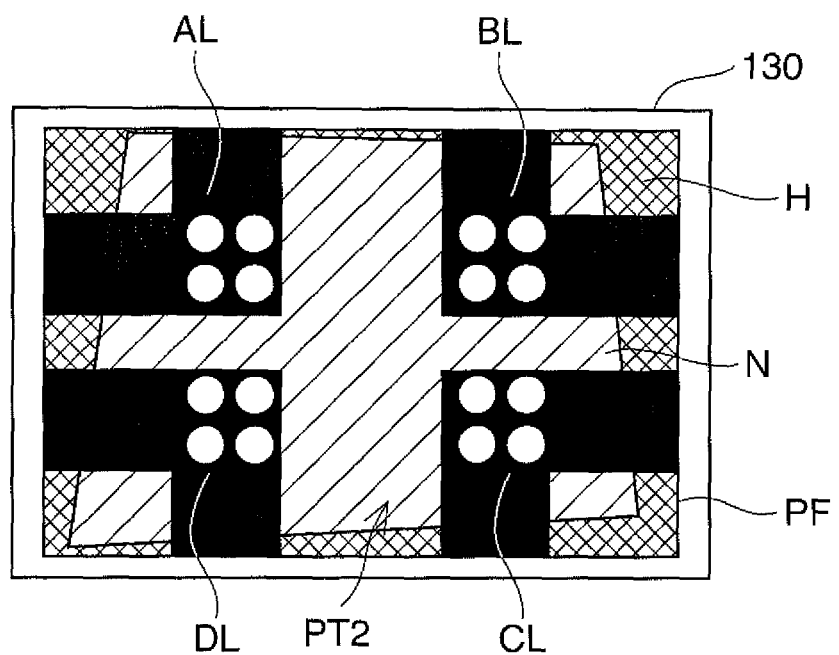
FIG. 11 shows an example of a measurement pattern formed on the liquid crystal panel at step S50.

FIG. 11 shows an example of the measurement pattern PT2 formed on the liquid crystal panel 130 at step S50. The measurement pattern PT2 shown in FIG. 11 has L-shaped black areas AL, BL, CL, DL each with four measurement points in the corner parts in the respective corners of the liquid crystal panel 130. The two crossing line area parts of the L-shaped black areas AL, BL, CL, DL extend from the inside toward the outside of the image formation area of the liquid crystal panel 130. Note that the L-shaped black area corresponds to "nearly black area" of the application. The area shown by hatching in FIG. 11 is an area in which the input image after distortion correction is displayed. In the first execution of step S50, the input image N after trapezoidal distortion correction calculated by the initial screen frame correction processing is displayed. As shown in FIG. 11, in the embodiment, the measurement pattern PT2 is superimposed on the input image after distortion correction and displayed. Further, in FIG. 11, the area shown by cross hatching outside of the input image N after trapezoidal distortion correction is a background area H, and is blacked out in practice.

When the measurement pattern PT2 is projected, like the initial screen frame correction processing, the pattern detection part 122 detects measurement points from the taken pattern image (step S120), and the coordinate conversion part 124 calculates a coordinate conversion factor with respect to each corner (step S130). The line detection part 123 performs edge detection from the measurement point sides of the L-shaped black area toward the screen frame SCF, and detects eight screen frame lines in total, two for each corner (step S155). After the screen frame lines and the coordinate conversion factors are calculated, like the initial screen frame correction processing, the screen frame lines are converted from camera coordinates into panel coordinates (step S160), and a correction value is calculated (step S170). Then, trapezoidal distortion correction of the input image is performed in response to the correction value (step S180).

Then, the CPU 160 determines whether or not a predetermined time has elapsed after the projector 10 comes to rest in response to the sensing result of the vibration by the vibration sensing unit 129 (step S185). If the predetermined time has not elapsed after the projector 10 comes to rest (step S185: No), step S50 to step S180 are executed again. Accordingly, the measurement pattern PT2 is superimposed on the input image after trapezoidal distortion correction being displayed by the pattern output part 121. Then, when a new correction value is obtained, the input image after trapezoidal distortion correction being displayed is replaced by the updated input image after trapezoidal distortion correction. In this manner, when the user continues to move the projector 10, step S50 to step S180 are repeatedly executed, the correction values are calculated, and the updated input images after trapezoidal distortion correction are displayed. That is, on the screen 30, the input images N after trapezoidal distortion correction are changed and displayed one after another in real time.

If the CPU 160 determines that the predetermined time has elapsed after the projector 10 comes to rest (step S185: Yes), the CPU allows the pattern output part 121 to stop output of the measurement pattern PT2, and deletes the measurement pattern PT2 superimposed on the image (step S190).

According to the above explained automatic screen frame correction processing by the projector 10, the screen frame SCF is detected as the eight lines in total, two lines for each corner of the screen 30 and the correction is performed using the coordinate conversion factors corresponding to the respective corners, and thus, the same effect as that of the above described initial screen frame correction processing is exerted. Further, the measurement pattern superimposed on the input image after trapezoidal distortion correction includes the black areas having the measurement points as shown in FIG. 11, and covers only a part of the input image after trapezoidal distortion correction. Accordingly, the user may appropriately install the projector 10 while confirming the input images after trapezoidal distortion correction. Further, even when the projector 10 moves, the input images after trapezoidal distortion correction are continuously displayed in real time, and thus, viewing may not be interrupted and stress on the user may be reduced.

E. Modified Examples

As below, one embodiment of the invention has been explained, and the invention is not limited to the embodiment, but may employ various configurations without departing from the scope of the invention.

E1. Modified Example 1

The measurement patterns used at step S110 in the above described initial screen frame correction processing and step S50 in the automatic screen frame correction processing have four pattern areas each with four measurement points, 16 measurement points in total. However, the number of measurement points of the measurement pattern is not limited to that, but may be four or more in total. When there are four or more measurement points, the coordinate conversion factors for projection conversion from camera coordinates into panel coordinates may be calculated. For example, each measurement area may have one measurement point or a measurement pattern having one measurement area with four measurement points may be employed. Further, the shape of the measurement point may be a square shape or cross shape, for example, as long as it is a shape that can be detected by image processing. Further, at step S110 in the initial screen frame correction processing, a measurement pattern having only measurement points without the black area parts may be used as long as the measurement patterns can be detected.

E2. Modified Example 2

Figure 12:
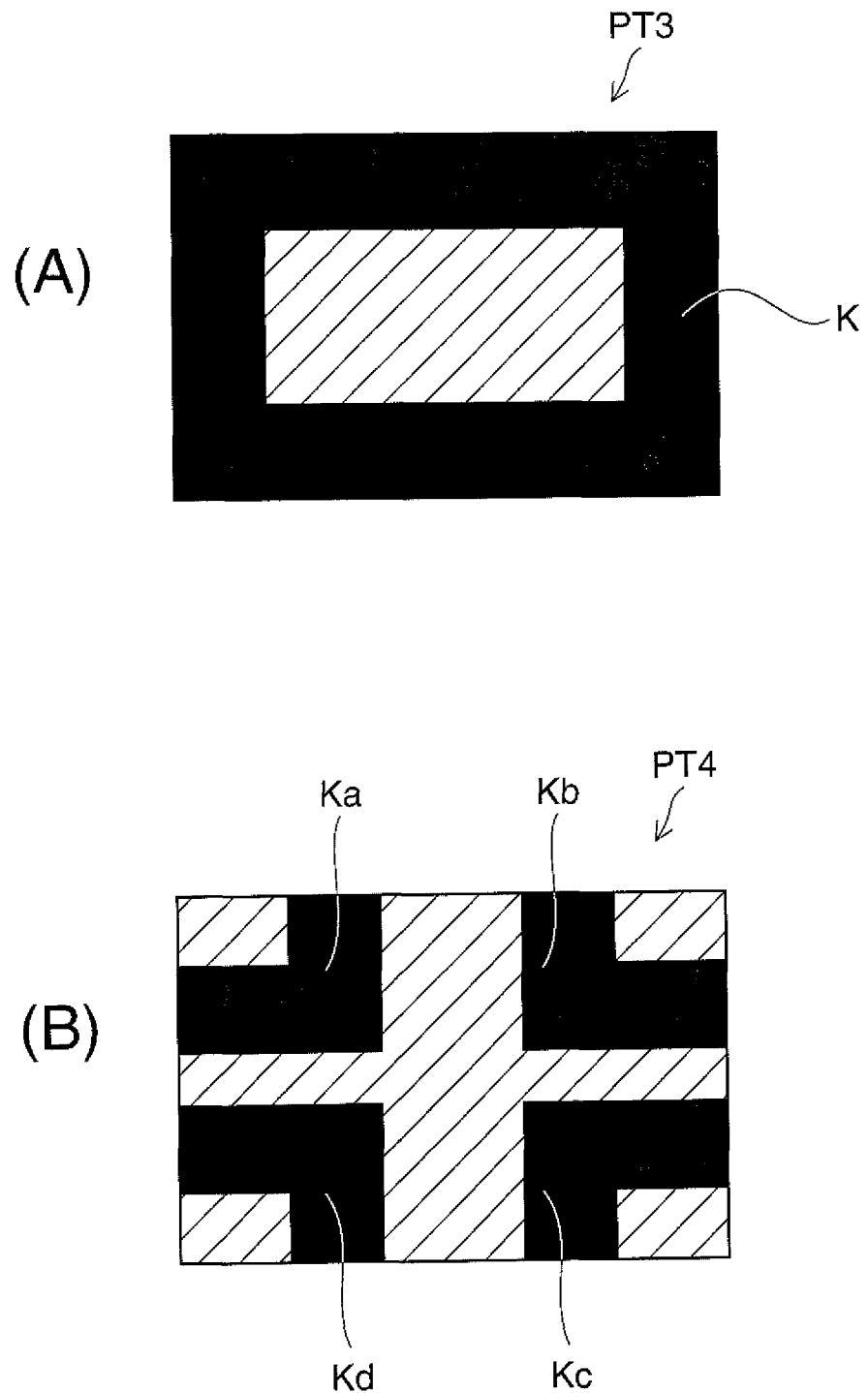
FIGS. 12A and 12B show examples of black images projected for detection of screen frame lines at step S140.

At step S140 in the above described initial screen frame correction processing, the solid black image has been projected for detection of the screen frame lines at step S150, however, the projected black image may not be the solid black image. FIGS. 12A and 12B show examples of black images projected for detection of screen frame lines at step S140. For example, like a black image PT3 shown in FIG. 12A, for superimposition of the black area of the display image on the screen frame SCF, a black image having a background area at the center, for example, and a black area K in the periphery may be employed. Further, like a black image PT4 shown in FIG. 12B, a black image having black areas Ka, Kb, Kc, Kd in the respective corners of the liquid crystal panel 130 may be employed. Furthermore, the black areas explained in the above described initial screen frame correction processing and automatic screen frame correction processing (including the L-shaped black areas and black images) are not limited to complete black. For example, regardless of color, an area with lower brightness (for example, brightness from 0% to 10%) may be employed.

E3. Modified Example 3

At step S150 in the above described initial screen frame correction processing, the line detection part 123 has equally divided the line segment C3D4 formed by connecting the measurement points into three and performed edge detection on the width with respect to the screen frame SCF (see (A) and (B) in FIG. 7), however, the width for the edge detection is not limited to that. The width for the edge detection can be arbitrarily set.

E4. Modified Example 4

In the above described initial screen frame correction processing, the intersection between lines has been obtained after the screen frame lines are converted from camera coordinates into panel coordinates, however, the apex of the frame may be obtained by obtaining the intersection of the lines on the camera coordinates, and then, converting the intersection into panel coordinates using the coordinate conversion factor.

E5. Modified Example 5

Figure 13:
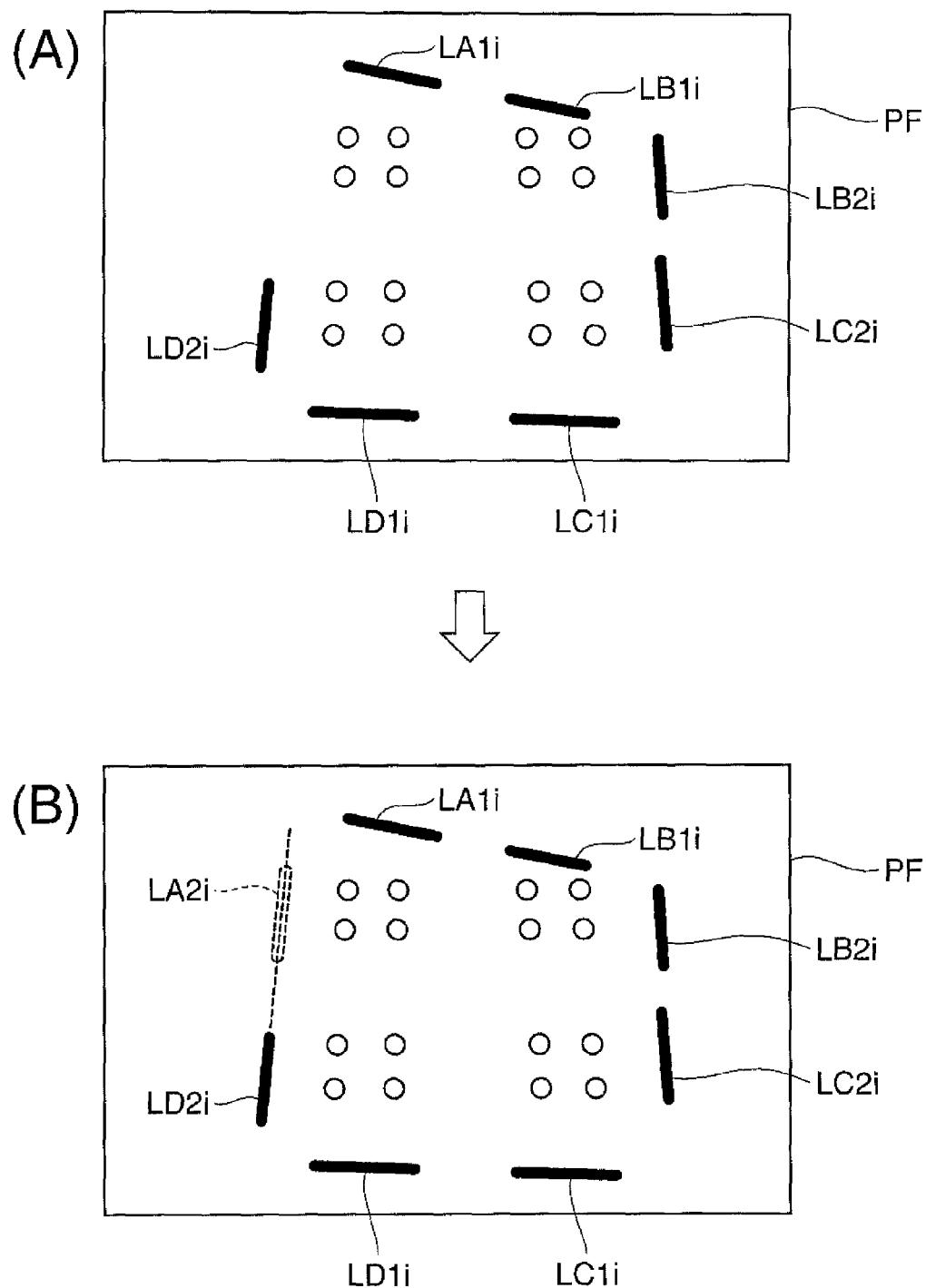
FIG. 13 shows diagrams for explanation of processing when part of eight screen frame lines is not detected by edge detection.

Depending on the installation status of the screen 30, illumination may be reflected on the screen 30 or the color of the screen frame may partially vary, and the eight screen frame lines may not be detected by edge detection. Also, in this case, the projector 10 may perform the above described screen frame correction processing. FIG. 13 shows diagrams for explanation of processing when part of eight screen frame lines is not detected by edge detection. In a panel image shown in (A) in FIG. 13, a screen frame line LA2$i$ (see (A) in FIG. 8) that should cross with a screen frame line LA1$i$ has not been detected. In this case, the line detection part 123 extends a screen frame line LD2$i$ estimated to be on the same screen frame SCF as that of the screen frame line LA2$i$ and complements the undetected screen frame line LA2$i$ ((B) in FIG. 13). In the above described screen frame correction processing, the screen frame lines are divided and detected in eight lines, and thereby, even when the undetected screen frame line exists, it may be complemented by a screen frame line estimated to approximate it. Accordingly, even when there is an undetected line in the frame image, trapezoidal distortion correction may be performed.

Note that, in the case where neither the screen frame line LA2$i$ nor the screen frame line LD2$i$ estimated to be on the same screen frame SCF may be detected, the two screen frame lines may be complemented by known methods shown in JP-A-2010-05042 and JP-A-2008-211355. By using the methods, it is only necessary that at least one of the eight screen frame lines may be detected, and the success rate of line detection may be improved.

E6. Modified Example 6

Figure 14:
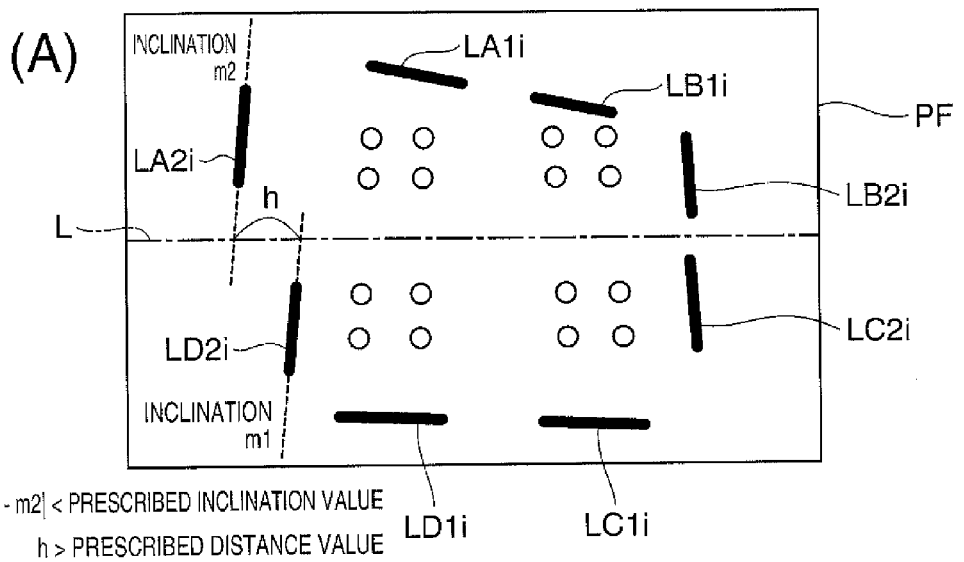
FIG. 14 shows diagrams for explanation of processing when a line detection part erroneously detects screen frame lines.
Figure 14:
Figure 14:
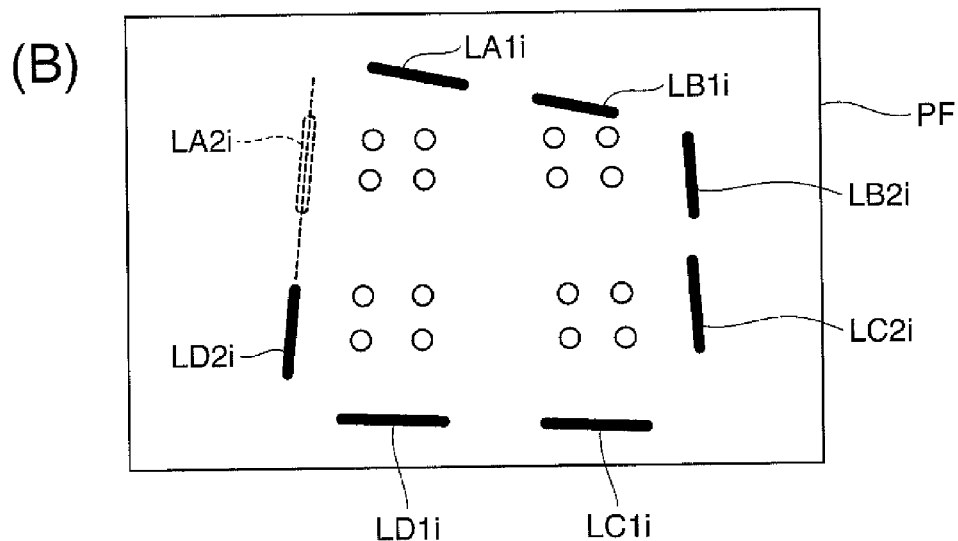

FIG. 14 shows diagrams for explanation of processing when the line detection part 123 erroneously detects screen frame lines for edge detection of the frame image. In a panel image shown in (A) in FIG. 14, the screen frame line LA2$i$ and the screen frame line LD2$i$ estimated to be on the same screen frame SCF are detected to be apart. If the apexes are obtained based on the screen frame lines and trapezoidal distortion correction is performed, the screen frame may not coincide with the respective sides of the display image. In order to prevent the situation, the line detection part 123 first obtains relation values of positions and inclinations of the two screen frame line LA2$i$ and screen frame line LD2$i$ estimated to be on the same screen frame. For example, the intersections between the median line L and the respective screen frame lines in the panel image are calculated, and the distance h between the respective intersections is calculated ((A) in FIG. 14). Further, the line detection part 123 calculates an absolute value m2 of the inclination of the screen frame line LA2$i$ and an absolute value m1 of the inclination of the screen frame line LD2$i$, and obtains an absolute value |m1−m2| of the difference. Then, the part respectively determines whether or not the distance h is equal to or less than a predetermined value, and whether or not the absolute value |m1−m2| of the difference between the absolute values m1, m2 of the inclinations is equal to or less than a predetermined value. As a result of determination, if at least one of the values is equal to or more than the predetermined value, one value of the screen frame line LA2$i$ and the screen frame line LD2$i$ is discarded. In (A) in FIG. 14, the inclinations of the screen frame line LA2$i$ and the screen frame line LD2$i$ are nearly equal, and |m1−m2| is within the predetermined value and the distance h is equal to or more than the predetermined value. In the case of the positional relationship as shown in (A) in FIG. 14, the line detection part 123 discards the screen frame line LA2$i$ located farther from the measurement points, and extends the screen frame line LD2$i$ and complements the screen frame line LA2$i$ ((B) in FIG. 14).

Figure 15:
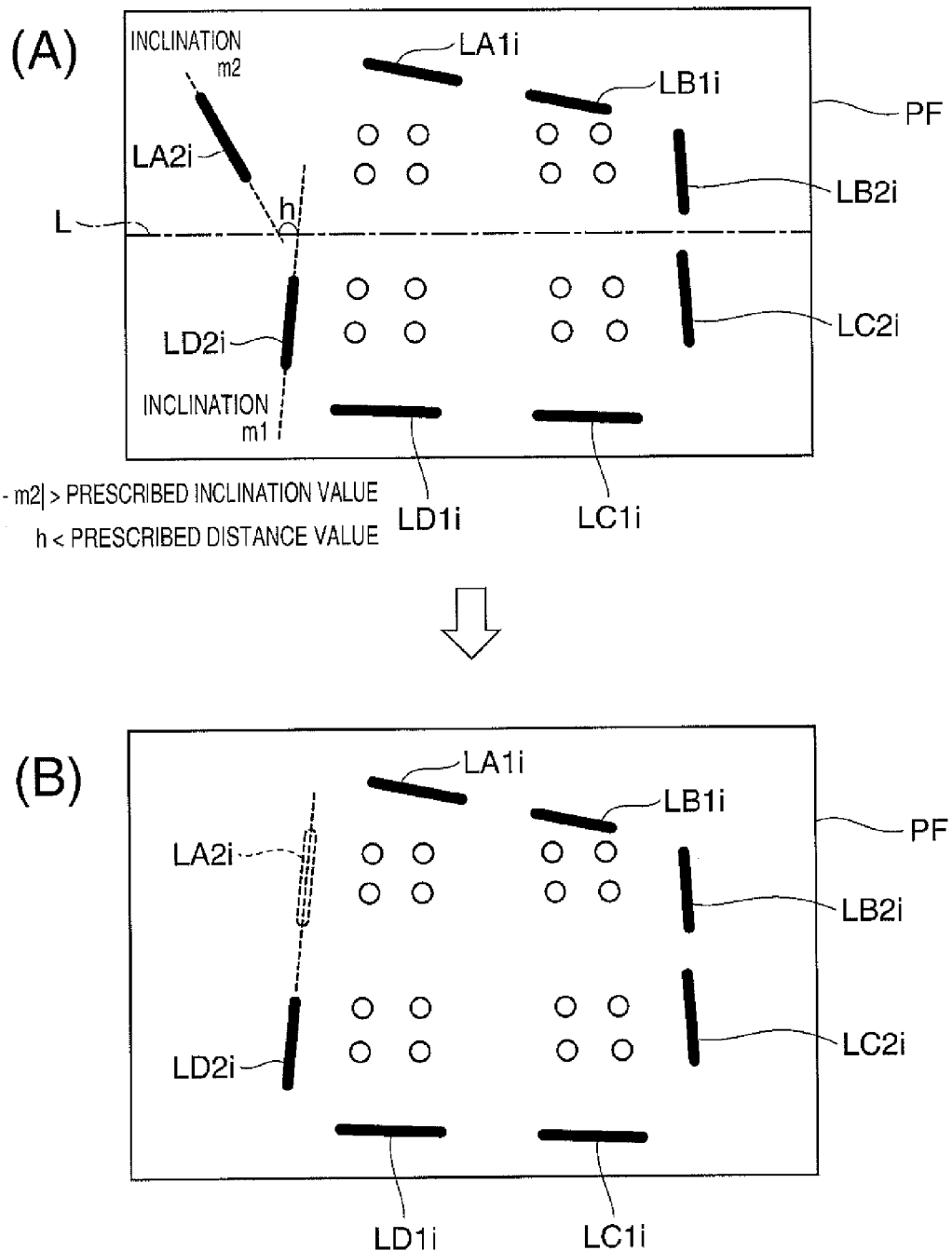
FIG. 15 shows other diagrams for explanation of processing when the line detection part erroneously detects screen frame lines.

FIG. 15 shows other diagrams for explanation of processing when the line detection part 123 erroneously detects screen frame lines for edge detection of the frame image. The distance h between the two screen frame line LA2$i$ and screen frame line LD2$i$ estimated to be on the same screen frame SCF is within the predetermined value, however, the absolute value |m1−m2| of the difference between the absolute values m1, m2 of the inclinations is equal to or more than the predetermined value. In this case, the line detection part 123 discards the screen frame line LA2$i$ having the more different inclination than the inclination of the left frame of the image formation area of the liquid crystal panel 130, and extends the screen frame line LD2$i$ and complements the screen frame line LA2$i$ ((B) in FIG. 15). Even when the erroneously detected screen frame line exists, the screen frame lines are divided and detected in eight, and thereby, the erroneously detected line may be determined and complemented by a screen frame line estimated to be approximate it. Therefore, even when there is erroneous detection, trapezoidal distortion correction can be performed with high accuracy.

Note that the complement processing of screen frame lines in the modified example 5 and the modified example 6 can be performed on the camera coordinates, however, more preferably performed on the panel coordinates. This is because complement may be performed with a screen frame line estimated to be further approximate it by performing complement processing after the distortion of the lens of the camera of the projector 10 is eliminated.

E7. Modified Example 7

As the input image after trapezoidal distortion correction obtained by the automatic screen frame correction processing to be projected at the above described step S180, an image formed by calculating an intermediate correction value between the current correction value and the correction value that has been calculated before the calculation of the current correction value (previous correction value), and performing trapezoidal distortion correction based on the intermediate correction value may be displayed. For example, first, the intermediate correction value between the correction value calculated by the fifth processing and the correction value calculated by the sixth processing is calculated. Then, after the image formed by trapezoidal distortion correction is displayed based on the intermediate correction value, the input image formed by trapezoidal distortion correction based on the correction value calculated by the sixth processing may be displayed. Further, a plurality (for example, three or four) of the intermediate correction values are calculated and images formed by trapezoidal distortion correction based on the values are sequentially displayed, and then, the input image formed by trapezoidal distortion correction based on the sixth correction value may be displayed. Furthermore, during automatic screen frame correction processing, an image formed by trapezoidal distortion correction based on an intermediate correction value between the current correction value and the correction value that has been calculated before the calculation of the current correction value may be displayed and, after the automatic screen frame correction processing is ended, an image formed by trapezoidal distortion correction based on the current correction value may be displayed. In this manner, the input images may be smoothly changed and displayed, and thus, the user may confirm the input images after trapezoidal distortion correction without a feeling of strangeness.

E8. Modified Example 8

At the above described step S50, the measurement pattern containing both the black area for screen frame line detection and the measurement points for calculation of coordinate conversion factor has been projected on the image after trapezoidal distortion correction, however, the black area, the measurement points, and the image after trapezoidal distortion correction may be alternately and time-divisionally displayed. Further, at step S50, the measurement points may be continuously displayed and the black area and the image after trapezoidal distortion correction may be alternately and time-divisionally displayed.

E9. Modified Example 9

At the above described step S185, the measurement pattern PT2 superimposed on the image if the predetermined time has elapsed has been deleted, however, the predetermined time may be set longer if it is impossible to detect the eight screen frame lines directly from the frame image at step S155. Even if it is impossible to detect the eight screen frame lines by edge detection, the screen frame lines can be complemented as described in the above described modified examples. However, the screen frame lines actually detected from the frame image reflect the influence of the distortion of the camera lens more than the complemented screen frame lines, and thus, the more appropriate input image after trapezoidal distortion correction with eliminated distortion may be calculated. Accordingly, if it is impossible to detect the screen frame lines, the time to deletion of the measurement pattern PT2 from the input image may be made longer, and the user may reinstall the projector 10 in the position in which the screen frame lines can be detected from the frame image.

E10. Modified Example 10

In the above described embodiment, the vibration sensing unit 129 has sensed the vibration from the gyro sensor of the projector 10, however, the vibration sensing unit 129 may include another vibration sensor such as an acceleration sensor in place of the gyro sensor. Further, the vibration sensing unit 129 may sense the vibration of the projector 10 by analyzing the change of the background image regardless of the sensor.

E11. Modified Example 11

In the above described embodiment, in the area in which the input image N after trapezoidal distortion correction is displayed, an image representing only the frame lines of the input image N after trapezoidal distortion correction or an image in which the part inside of the frame lines of the input image N after trapezoidal distortion correction is painted in color (for example, white or blue) different from the color outside of the frame lines (corresponding to "an image formed by trapezoidal distortion correction on a predetermined figure" of the application) may be displayed. By displaying these images, the processing load for trapezoidal distortion correction may be reduced, and the shapes of the input images after correction may be displayed at a high speed. Note that these images preferably have shapes similar to the image formation frame of the liquid crystal panel, and more preferably have the same shape.

E12. Modified Example 12

In the projector 10 in the above described embodiment, the initial screen frame correction processing and the automatic screen frame correction processing have been performed, however, only one screen frame correction processing may be performed.

E13. Modified Example 13

In the above described embodiment, the example in which the projector 10 uses the transmissive liquid crystal panel 130 as the light modulator has been explained, however, the light modulator is not limited to the transmissive liquid crystal panel 130. For example, the projector may have a configuration in which a digital micro-mirror device (DMD), a reflective liquid crystal panel, or the like is used as the light modulator for modulation of the light from the illumination system 140. Further, a CRT (cathode ray tube) projector that projects an image on a small CRT on a projected surface may be employed.

E14. Modified Example 14

In the above described embodiment, the image processing device according to the invention has been applied to the projector, however, the image processing circuit 120 shown in FIG. 2 can be regarded as the image processing device. Further, in the above described embodiment, the image processing circuit has performed screen frame correction processing as hardware, however, the CPU may execute screen frame correction processing as software by execution of a program.

What is claimed is:
1. An image processing device comprising:
   a pattern output part that superimposes a pattern having a predetermined shape and a nearly black area on a part of an image and outputs the image to a light modulator;
   a pattern detection part that detects the pattern from a pattern image formed by imaging of the image containing the pattern and the nearly black area projected on a projected surface;
   a line detection part that detects at least two lines of each side of a frame, based on a taken image of at least a part of the frame of the projected surface within the nearly black area in the pattern image, a total number of lines detected for the frame being at least eight lines;
   a coordinate conversion factor calculation part that calculates a coordinate conversion factor for conversion of coordinates in the taken image into coordinates in the light modulator based on coordinates of the pattern in the light modulator and coordinates of the pattern detected from the pattern image;
   a correction value calculation part that obtains an apex of the frame based on the detected line and the coordinate conversion factor, and calculates a correction value for trapezoidal distortion correction based on the apex; and
   a distortion correction part that performs trapezoidal distortion correction based on the correction value.
2. The image processing device according to claim 1, wherein the line detection part respectively detects two crossing lines with respect to each corner of the projected surface based on the taken image of the at least the part of the frame of the projected surface within the nearly black area in the pattern image, and the correction value calculation part obtains apexes of the frame based on the detected two lines with respect to each corner and the coordinate conversion factors, and calculates a correction value for trapezoidal distortion correction based on the apexes.

3. The image processing device according to claim 1, wherein the pattern output part outputs an image formed by trapezoidal distortion correction on an input image or an image formed by trapezoidal distortion correction on a predetermined figure.

4. The image processing device according to claim 1, wherein the correction value calculation part calculates at least one intermediate correction value of a current correction value and a previous correction value calculated before calculation of the current correction value, and the distortion correction part performs the trapezoidal distortion correction based on the intermediate correction value.

5. The image processing device according to claim 2, wherein the pattern output part stops output of the pattern and the nearly black area if a shape of the frame of the image formed by the trapezoidal distortion correction or a shape of the frame of the image formed by the trapezoidal distortion correction on the predetermined figure has not changed in a predetermined time, and extends the predetermined time if the line detection part has not respectively detected two crossing lines with respect to each corner of the projected surface based on the frame image.

6. The image processing device according to claim 2, wherein the pattern is located for each corner of the light modulator, the coordinate conversion factor calculation part respectively calculates the coordinate conversion factor with respect to each corner of the projected surface, and the correction value calculation part obtains the apex based on the detected two crossing lines with respect to each corner of the projected surface and the coordinate conversion factor corresponding to the corner.

7. The image processing device according to claim 2, wherein the correction value calculation part obtains the apex of the frame after the line detection part converts the two lines detected with respect to each corner into coordinates in the light modulator.

8. A projector comprising:
the image processing device according to claim 1; and
a projection unit that has the light modulator and projects the image.

9. A projector comprising:
the image processing device according to claim 2; and
a projection unit that has the light modulator and projects the image.

10. A projector comprising:
the image processing device according to claim 3; and
a projection unit that has the light modulator and projects the image.

11. A projector comprising:
the image processing device according to claim 4; and
a projection unit that has the light modulator and projects the image.

12. A projector comprising:
the image processing device according to claim 5; and
a projection unit that has the light modulator and projects the image.

13. A projector comprising:
the image processing device according to claim 6; and
a projection unit that has the light modulator and projects the image.

14. A projector comprising:
the image processing device according to claim 7; and
a projection unit that has the light modulator and projects the image.

15. The image processing device according to claim 1, wherein the at least eight lines do not include any corners of the frame.

16. An image processing method comprising:
superimposing a pattern having a predetermined shape and a nearly black area on a part of an image and outputting the image to a light modulator;

detecting the pattern from a pattern image formed by imaging of the image containing the pattern and the nearly black area projected on a projected surface;

detecting at least two lines of each side of a frame, based on a taken image of at least a part of the frame of the projected surface within the nearly black area in the pattern image, a total number of lines detected for the frame being at least eight lines;

calculating a coordinate conversion factor for conversion of coordinates in the taken image into coordinates in the light modulator based on coordinates of the pattern in the light modulator and coordinates of the pattern detected from the pattern image;

obtaining an apex of the frame based on the detected line and the coordinate conversion factor, and calculating a correction value for trapezoidal distortion correction based on the apex; and performing trapezoidal distortion correction based on the correction value.

17. The image processing method according to claim 1, wherein the at least eight lines do not include any corners of the frame.

* * * * *